United States Patent [19]
Allen

[11] Patent Number: 5,967,089
[45] Date of Patent: Oct. 19, 1999

[54] LIGHT WEIGHT, COLLAPSIBLE, HINGED FENCING STRUCTURE PARTICULARLY SUITABLE AS A SMALL ANIMAL ENCLOSURE

[76] Inventor: Gerald M. Allen, 8600 Sheffield Ave., Dyer, Ind. 46311

[21] Appl. No.: 08/993,027

[22] Filed: Dec. 18, 1997

[51] Int. Cl.⁶ .............................. A01K 3/00; E04H 17/00
[52] U.S. Cl. .............................. 119/474; 119/513; 256/24
[58] Field of Search ...................... 119/452, 473, 119/474, 498, 504, 513, 519; 256/19, 21, 24, 26

[56] References Cited

U.S. PATENT DOCUMENTS

| | | | |
|---|---|---|---|
| Re. 28,643 | 12/1975 | Blum | 256/24 |
| 45,080 | 11/1864 | Sage et al. | 119/513 |
| 349,200 | 9/1886 | Balmer | 119/513 |
| 3,698,360 | 10/1972 | Rubricius . | |
| 4,526,347 | 7/1985 | McLoughlin | 256/33 |
| 4,787,603 | 11/1988 | Norton | 256/25 |
| 5,058,863 | 10/1991 | Maffet | 256/26 |
| 5,195,461 | 3/1993 | Brown | 119/61 |
| 5,381,757 | 1/1995 | Putney | 119/840 |
| 5,421,557 | 6/1995 | Vise | 256/24 |
| 5,556,080 | 9/1996 | Vise | 256/24 |
| 5,564,367 | 10/1996 | Boyanton | 119/474 |
| 5,609,327 | 3/1997 | Amidon | 256/26 |
| 5,718,414 | 2/1998 | Deloach et al. | 256/24 |

*Primary Examiner*—Robert P. Swiatek
*Assistant Examiner*—Elizabeth Shaw
*Attorney, Agent, or Firm*—Marshall, O'Toole, Gerstein, Murray & Borun

[57] ABSTRACT

A light-weight animal enclosure formed from a plurality of preferably rectangular panels hingedly interconnected that can be erected to form a complete enclosure wherein each panel is formed from a tubular polymeric frame structure that receives and holds in position a relatively light-weight polymeric sheet material, such as an acrylic sheet, such that each panel can be collapsed upon an adjacent panel for easy transportation and storage and the panels can be unfolded and positioned to encompass an enclosed area for animal exercise and/or grazing.

21 Claims, 8 Drawing Sheets

LIGHT WEIGHT, COLLAPSIBLE, HINGED FENCING STRUCTURE PARTICULARLY SUITABLE AS A SMALL ANIMAL ENCLOSURE

FIELD OF THE INVENTION

The present invention is directed to a relatively light-weight, collapsible fencing structure, particularly suitable for forming a grazing or recreational area for small animals, capable of being positioned to form a completely enclosed area when in use and having hinged panels capable of collapsing one upon another for ease in transport and storage. More particularly, the present invention is directed to a light-weight, collapsible fencing or animal enclosure structure formed from a plurality of hingedly connected, preferably rectangular see-through polymeric panels held within light-weight, hollow, tubular polymeric frame members. The frame members are spaced and hingedly connected one to another with interconnecting upper and lower joint plates made from polymeric material such that the entire fencing structure is light-weight, easy to interconnect to form an enclosed area and easy to collapse for transporting and storage.

BACKGROUND OF THE INVENTION AND PRIOR ART

Small animals bred for profit, and even household pets, sometimes are confined to small cage areas, particularly during house-training periods to minimize an area that an animal can drop waste and to prevent household damage of carpet and/or furniture. Examples include rabbits bred for profit, teething puppies and any household animal pets that are not yet house-trained or trained to excrete their body wastes outdoors. Confinement in very small cages, such as seen in pet stores, prevents the animal from obtaining sufficient exercise for maintenance of good muscle structure and tone and negatively contributes to an animal's happiness and/or breeding capabilities.

It is known to provide portable livestock corrals and modular, relocatable grazing enclosures for farm animals, such as shown in U.S. Pat. Nos. 5,381,757 and 4,787,603, but such structures are heavy, for example made from welded steel beams, or include very heavy slotted bases for receiving steel fencing structures and are not suitable for being erected and stored easily. Further, others have provided small, stackable animal cages made from molded plastic material as shown in the Rubricius U.S. Pat. No. 3,698,360, but such structures are not capable of allowing any substantial exercise for the caged animal.

SUMMARY OF THE INVENTION

In brief, the present invention is directed to a light-weight animal enclosure formed from a plurality of preferably rectangular panels hingedly interconnected that can be erected to form a complete enclosure wherein each panel is formed from a tubular polymeric frame structure that receives and holds in position a relatively light-weight polymeric sheet material, such as an acrylic sheet, such that each panel can be collapsed upon an adjacent panel for easy transportation and storage and the panels can be unfolded and positioned to encompass an enclosed area for animal exercise and/or grazing.

Accordingly, one aspect of the present invention is to provide a light-weight, collapsible fencing structure comprising a plurality of hingedly connected panels capable of interconnection to form an enclosure for small animals, e.g., dogs, cats, rabbits, guinea pigs, and the like, each panel formed from hollow tubular polymeric frame members that receive a removable sheet material layer.

Another aspect of the present invention is to provide a collapsible animal enclosure having a frame structure that includes a removable sheet material layer, such that upon removal of the sheet material layer, a small animal cage can be disposed adjacent the remaining frame structure for animal release into the animal enclosure.

Still another aspect of the present invention is to provide a relatively inexpensive, collapsible fencing structure that includes a plurality of hingedly interconnected rectangular panels, each panel formed from a lightweight polymeric frame structure that carries a transparent sheet material layer for visibility of the contained animal(s).

The above and other aspects and advantages of the present invention will be better understood with reference to the following detailed description of the preferred embodiments, read in conjunction with the drawings.

DESCRIPTION OF THE PREFERRED EMBODIMENTS

Figure 1:
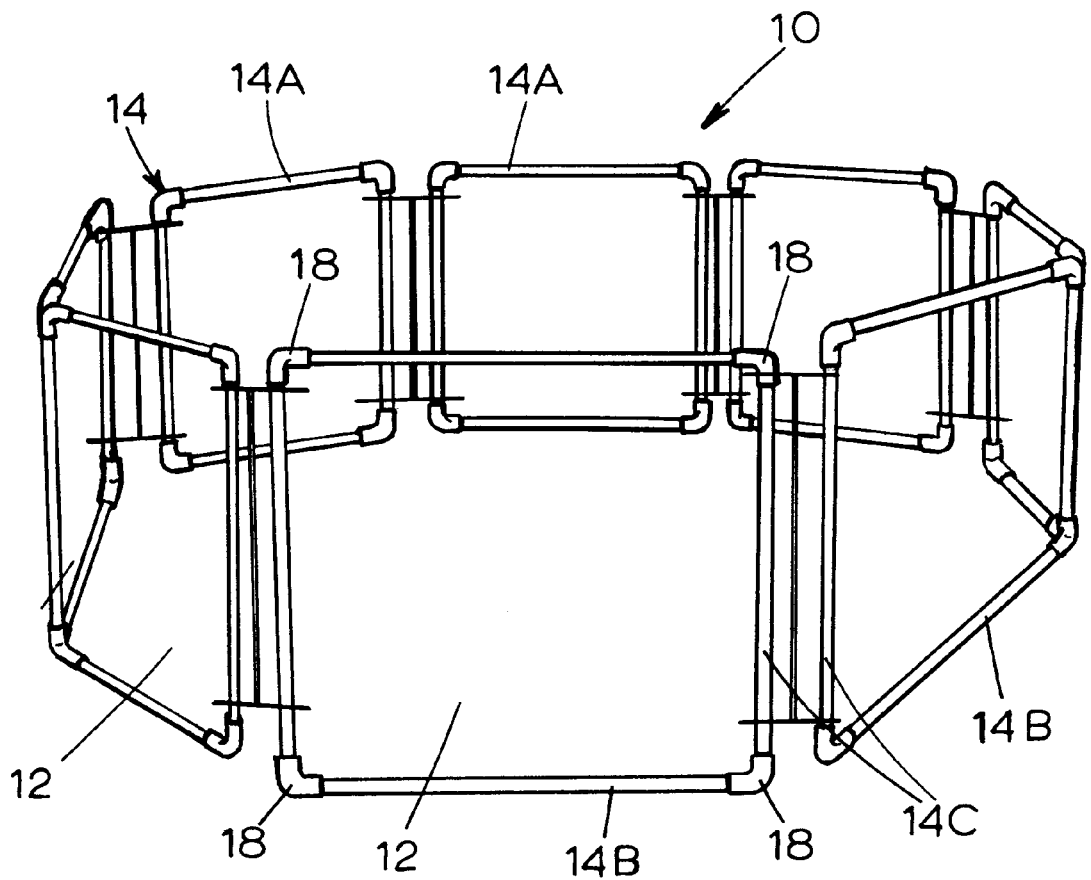
FIG. 1 is a perspective view of one embodiment of the fencing structure of the present invention.
Figure 2:
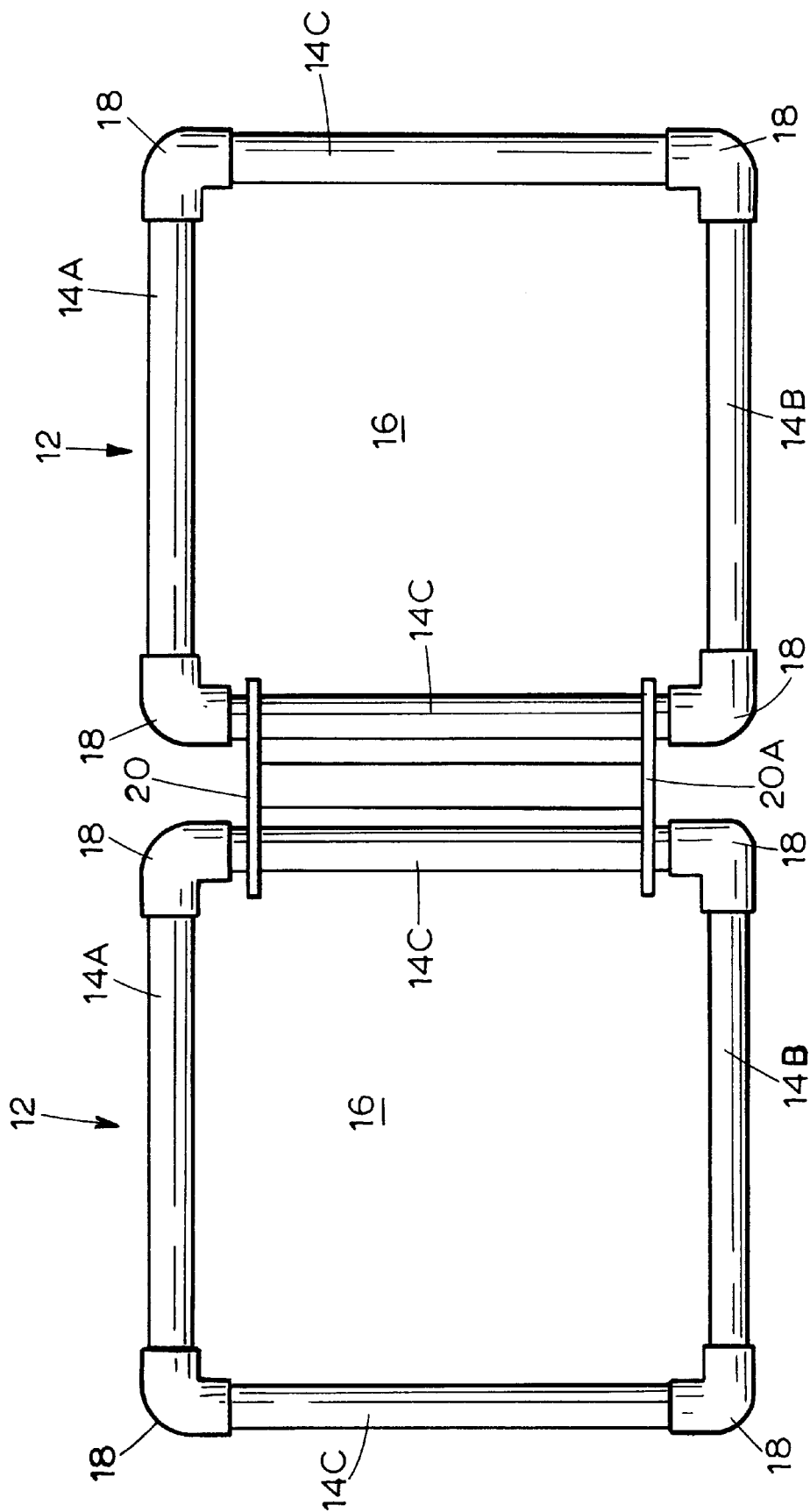
FIG. 2 is a front view of a portion of the fencing structure of FIG. 1 showing two adjacent, hingedly interconnected panels.

As shown in FIGS. 1 and 2, the animal enclosure or fencing structure 10, in the preferred embodiment, is formed from a plurality of hingedly interconnected rectangular panels 12, each panel 12 being formed from a plurality of interconnected polymeric, tubular frame members 14 including a horizontal upper frame member 14A, a horizontal lower frame member 14B, and a pair of vertical side frame members 14C. Each side frame member 14C interconnects at its distal ends to distal ends of the upper frame member 14A and the lower frame member 14B. The tubular frame members 14 receive and hold in position a planar sheet material layer 16, preferably a transparent sheet material, such as an acrylic sheet material, held in position by the frame members 14, as will be explained in more detail hereinafter. The tubular frame members 14 preferably are formed from a hollow tubular polymeric material, such as polyvinyl chloride (PVC) pipe, adhesively connected or heat fused to PVC L-shaped elbows 18, which interconnect the distal ends of horizontal upper and lower frame members 14A and 14B to the distal ends of the vertical side frame members 14C at the frame corners.

Figure 3:
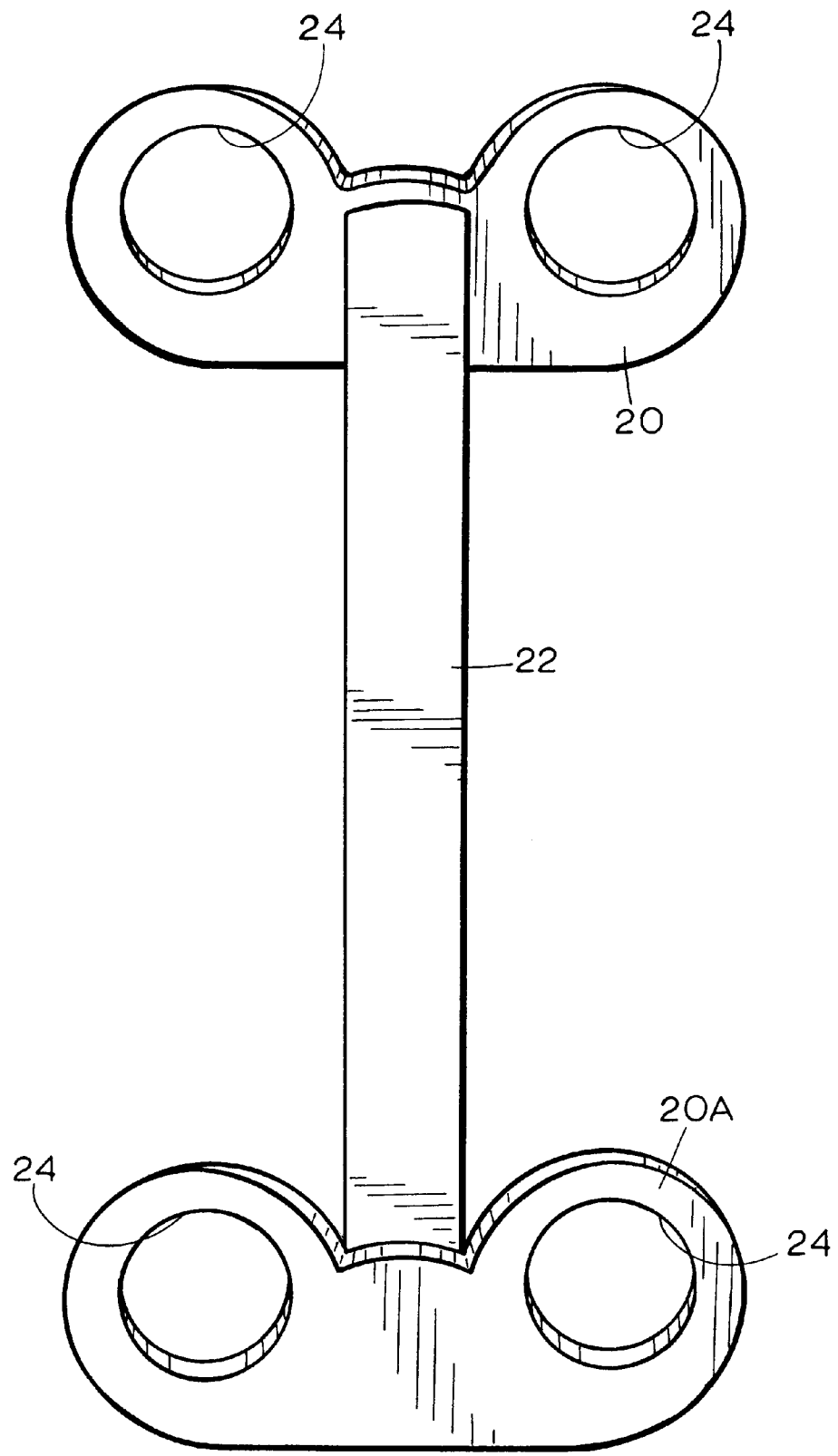
FIG. 3 is a perspective view of two structurally interconnected upper and lower hinge members that interconnect adjacent panels.

Each panel 12 is hingedly connected to an adjacent panel 12 by a spaced pair of hinge plate members 20 and 20A, best shown in FIG. 3. The hinge plate members 20 and 20A are preferably interconnected with a support structure or spacing member or spacing tube 22 to space the hinge plates 20 and 20A at upper and lower portions of the vertical side frame members 14C. In a preferred embodiment, the hinge plate spacing tube 22 is a light-weight, hollow polymeric tube, e.g., PVC, like the frame members 14A, 14B and 14C. Each hinge plate 20, 20A is formed, e.g., stamped or cut, from a light-weight polymeric planar sheet material, such as polyvinyl chloride, and include enclosed openings or apertures 24 slightly larger than a diameter of the vertical side frame members 14C. The vertical side frame members 14C of each panel 12 are received within the openings 24 during manufacture, prior to securing the elbows 18 to interconnect upper and lower frame members 14A and 14B to the side frame members 14C. The side frame members 14C can rotate within the openings 24 to collapse the fencing structure by reticulating each panel 12 upon an adjacent panel for storage and transportation, and for unfolding the stored fencing structure in order to create an enclosure when the fencing structure is erected for use. The swing plate spacer tube 22, in the preferred embodiment, is formed from a polymeric tubular material, such as the same polyvinyl chloride tubing or pipe that forms the frame members 14 and is heat-fused or adhesively connected to the swing joint structures 20 and 20A.

Figure 4:
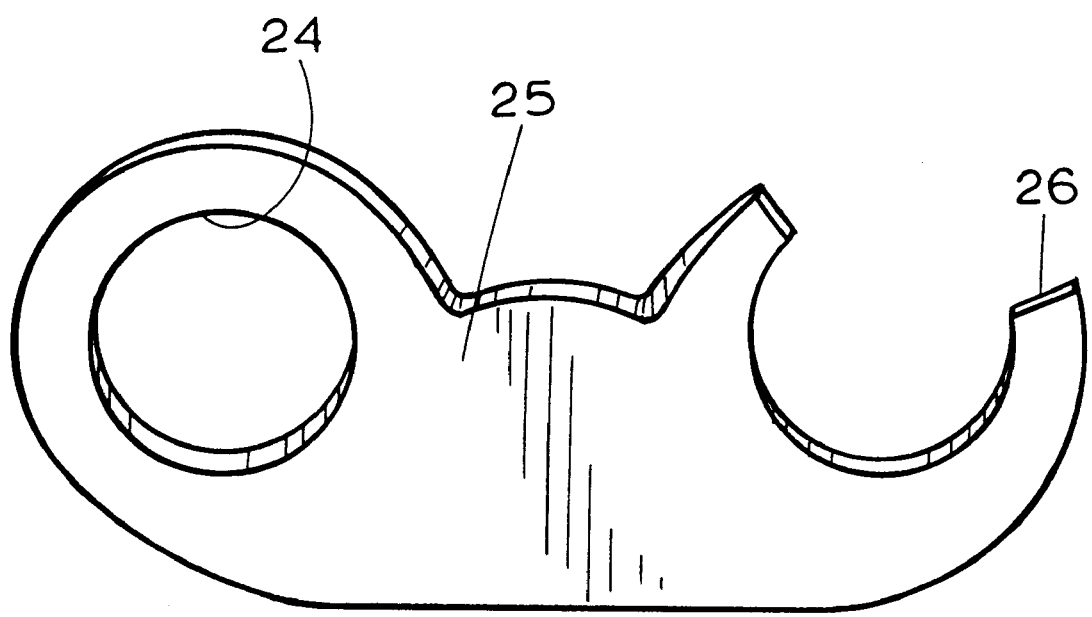
FIG. 4 is a perspective view of an open hinge structure for manually connecting and disconnecting adjacent fencing structure end panels for collapsing the fencing structure for storage and transportation.

In accordance with an important feature of the present invention, as shown in FIG. 4, one interconnected pair of swing joints or hinges 25 is constructed such that each joint 25 includes an opening 26 disposed to align with an adjacent vertical frame member 14C of an adjacent panel 12 so that the hinge 25 operates as a gate means for attaching and disconnecting two end panels 12. One end panel 12 carrying swing joints 25 may be manually engaged and disengaged from the adjacent vertical frame member 14C of another end panel 12 for connecting and disconnecting the fencing structure 10 and so that adjacent panels 12 can be folded, one upon another, in a reticulated manner, for storage and transportation. The open swing joints 25 allow one end panel 12 to be disengaged from an adjacent end panel 12 for entrance of a human, additional animals, and the like and the swing joints or gate means 25 can be manually returned to connect with a vertical frame member 14C of an adjacent end panel 12 to complete an enclosure, via openings 26, made slightly larger than the diameter of the vertical side frame member 14C, e.g., a ⅞ inch opening for receiving a ¾ inch outer diameter vertical side frame member 14C.

Figure 5:
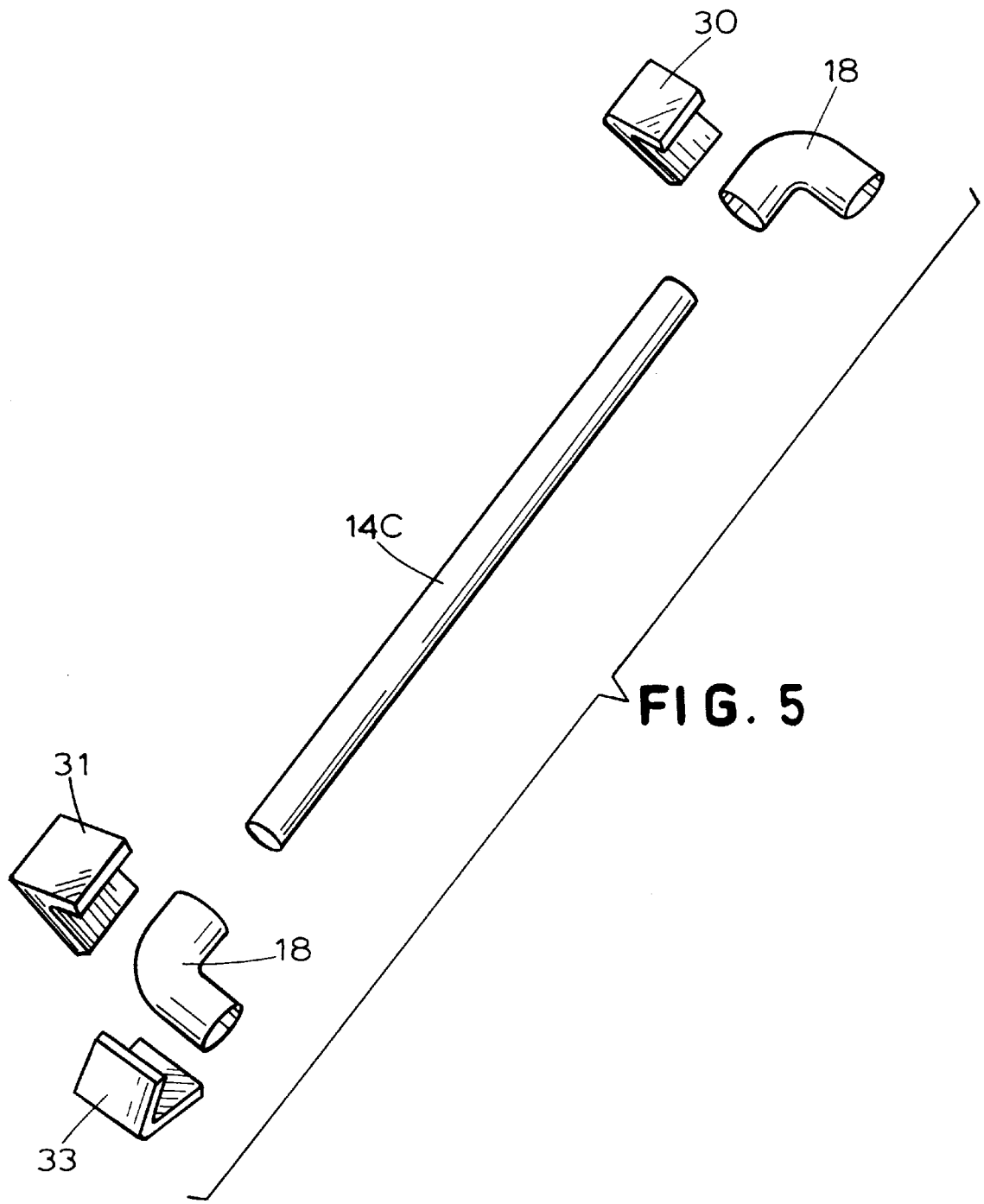
FIG. 5 is an exploded view of a vertical side frame member showing frame interconnection elbows and retaining clips for retention of a planar sheet material layer adjacent to the frame structure.
Figure 6:
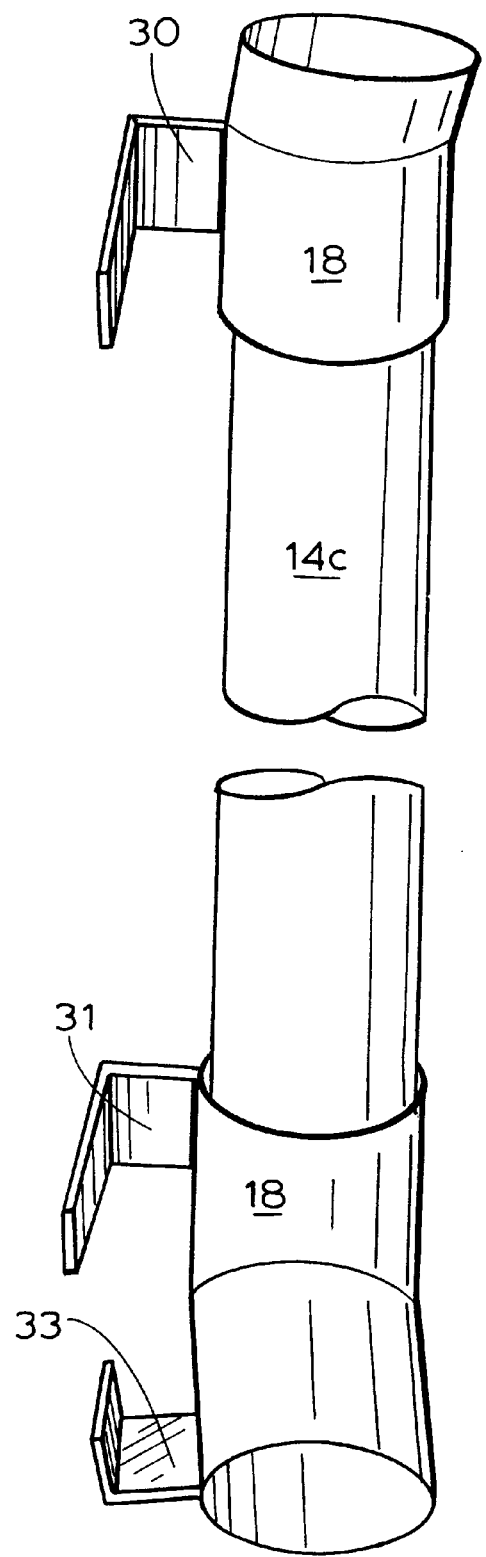
FIG. 6 is a perspective view of frame elbows and integral sheet material layer retaining clips.

As shown in FIGS. 5 and 6 in the preferred embodiment, one upper L-shaped sheet material layer retaining clip 30, and two lower L-shaped retaining clips 31 and 33 are heat-fused to the vertical side frame members 14C or to elbows 18 for retaining the polymeric sheet material 16 adjacent to the frame members 14A, 14B and 14C after slipping the panels into position from above the top frame member 14A. It should be noted that the top frame member 14A or elbow 18 requires only one L-shaped retaining clip on each side of the panel 12, allowing the acrylic panel to be removed from each panel 12 upwardly through retaining clip 30. At the bottom frame member 14B, or elbow 18, the pair of retaining clips 31 and 33 are provided for vertical and horizontal retention of the panel 16 to retain the panel 16 in position vertically above floor level as well as to keep the panel 16 from moving horizontally beyond the side frame members 14C of each panel 12.

Figure 8:
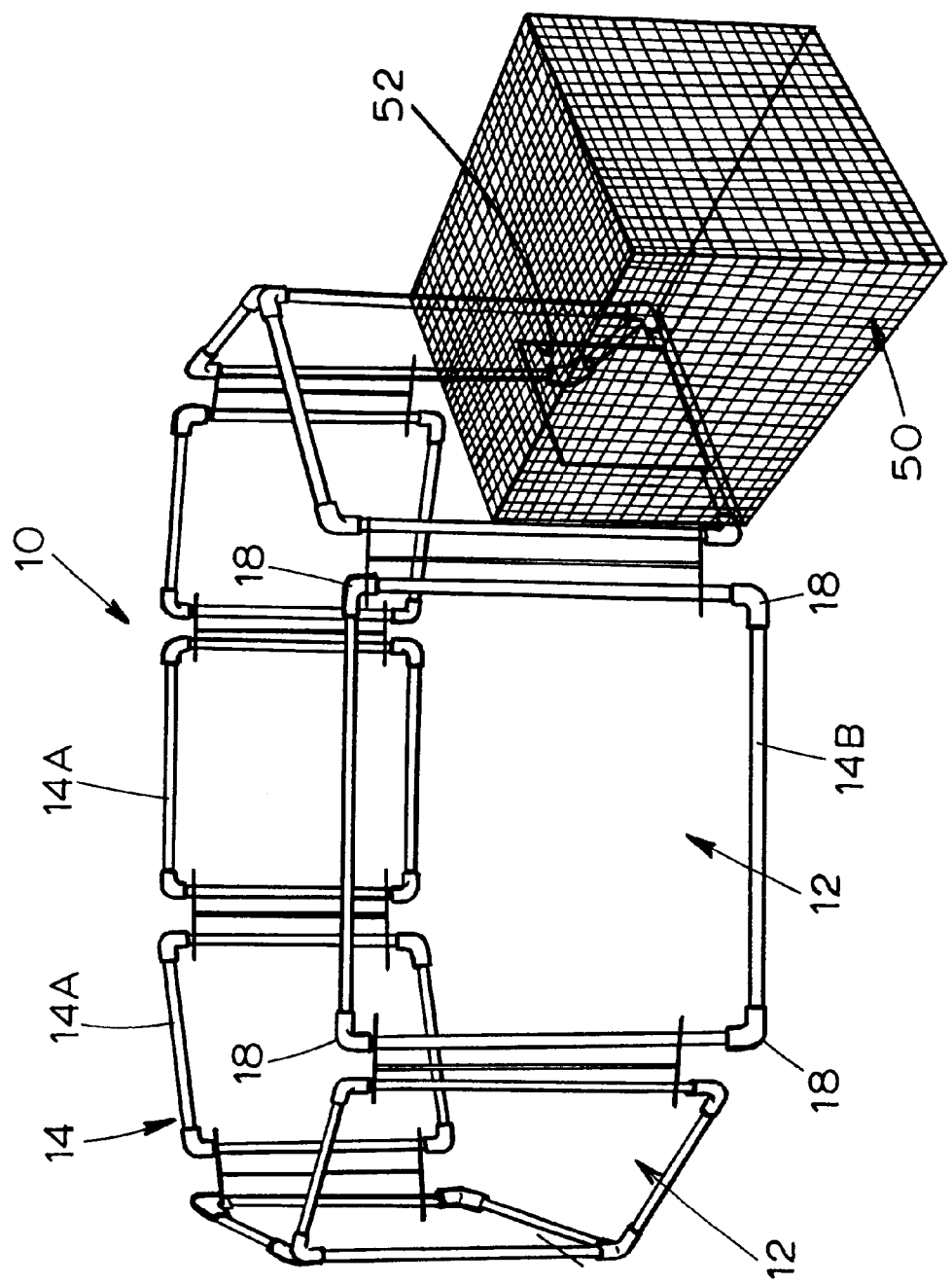
FIG. 8 is a perspective view of the fencing structure of the present invention showing a small animal cage disposed adjacent an open panel frame of the fencing structure for animal release into the fencing structure.

In accordance with one important embodiment of the present invention, as shown in FIG. 8, removal of one of the polymeric sheet material layers 16 provides an open frame structure adapted to receive a small animal cage 50, having access opening or cage door 52, so that an animal can be released from cage 50 into the fencing structure 10 without requiring human contact with the animal. If warranted, the sheet material layer 16 can be inserted in place after animal release, or the cage 50 can remain in place adjacent to the fencing structure in the event that the animal should desire to return to its cage 50.

Figure 7:
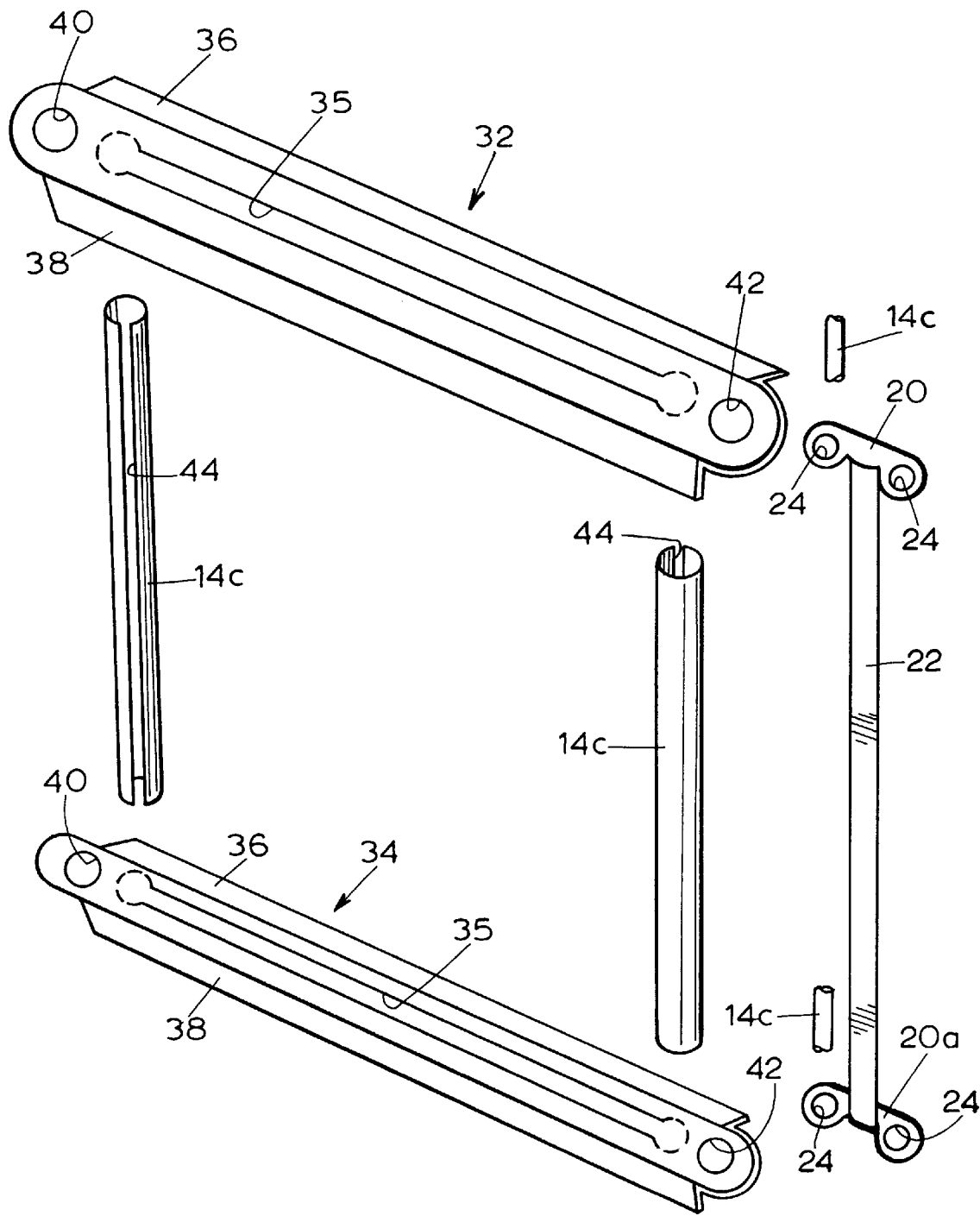
FIG. 7 is an exploded view of another embodiment of upper and lower frame members and their interconnection to side frame members and hinge plates.

In accordance with another embodiment of the present invention, as best shown in FIG. 7, upper and lower tubular frame member 14A and 14B can be replaced with a planar frame member 32 and lower frame member 14B can be replaced with a planar frame member 34. Upper and lower frame members 32 and 34 include a centrally-located slot 35 large enough to receive the sheet material 16 and the frame members 32 and 34 include integral elongated side extensions 36 and 38 which are heated to their softening temperature (approximately 300–350° F. for PVC) and bent upwardly or downwardly at a 20°–70° angle from horizontal to act as strengthening ribs. Upper and lower frame members 32 and 34 also include apertures 40 and 42 near their distal ends for receiving a bolt for rotatably interconnecting the upper frame member 32 to swing joint 20 and/or to secure the upper and lower frame members 32 and 34 to the vertical side frame members 14C. Alternatively, upper and lower frame members 32 and 34 may be heat-fused to vertical side frame members 14C. Alternatively, lower frame member 34 may include a centrally disposed depression or indentation instead of a slot 35 extending completely through the lower frame member 34 so that it can receive and hold in vertical position a lower edge of sheet material layer 16. If the slot 35 extends completely through the lower frame member 34, the slot may be closed along a lower edge of lower frame member 34 with one or more pieces of heat-fused material in order to receive the weight of the sheet material 16 thereon. Like upper frame member 32, lower frame member 34 includes frame member extensions 36 and 38 that are heated and bent upwardly or downwardly to act as strengthening ribs for the frame member 34.

In accordance with all embodiments of the present invention, as best shown in FIG. 7, the vertical side frame members 14C may include vertical slots 44 over their entire length for receiving and holding the sheet material 16 in place between vertical side frame members 14C. However, slotting of the vertical frame members 14 is not necessary to retain the sheet material 16 in position adjacent the frame members because of the L-shaped retaining clips described heretofore.

What is claimed is:

1. A collapsible fencing structure for containing animals comprising:

a plurality of rectangular panels hingedly interconnected; each panel including a hollow, rectangular, polymeric tubular frame structure including upper and lower tubular frame members interconnected to vertical side frame members; each panel including a planar sheet material layer held in close proximity to said frame structure; and a pair of spaced hinge-structures hingedly interconnecting an upper portion and a lower portion of side frame members of adjacent panels to permit adjacent panels to be collapsed one upon another for storage and transportation of the fencing structure when not in use, and to enable the fencing structure to be erected to form an animal enclosure, said hinge-structures comprising planar sheet material formed to include a pair of spaced apertures each of sufficient size to rotatingly receive a vertical side frame member; each hinge structure disposed to receive a vertical side frame member from two adjacent panels.

2. The fencing structure of claim 1, wherein the planar sheet material layers are transparent.

3. The fencing structure of claim 2, wherein the planar sheet material layers are made from an acrylic polymer.

4. The fencing structure of claim 1 further including L-shaped retaining clips secured to the frame structure for retaining the planar sheet material layers in close proximity to the frame structure.

5. The fencing structure of claim 1 further including a spacing member integrally attached to, and defining a spacing between the upper and lower hinge structures.

6. The fencing structure of claim 5, wherein said spacing member comprises a tubular polymeric structure.

7. The fencing structure of claim 1, further including gate means for attaching and disconnecting two adjacent end panels for access to within the fencing structure.

8. The fencing structure of claim 1, wherein at least one of the planar sheet material layers is removable.

9. The fencing structure of claim 1, wherein the planar sheet material forming the hinge structure comprises a planar sheet of polymeric material.

10. A collapsible fencing structure for containing animals comprising:
   a plurality of rectangular panels hingedly interconnected; each panel including a pair of vertical, spaced, polymeric tubular side frame members interconnected to upper and lower polymeric frame members; each panel including a planar sheet material layer held in close proximity to said upper, lower and pair of side frame members; and
   a pair of spaced hinge structures hingedly interconnecting an upper portion and a lower portion of said side frame members of adjacent panels to permit adjacent panels to be collapsed one upon another for storage and transportation of the fencing structure when not in use, and to enable the fencing structure to be erected to form an animal enclosure, wherein each hinge structure comprises planar sheet material formed to include a pair of spaced apertures each of sufficient size to rotatingly receive a vertical side frame member; each hinge structure disposed to receive a vertical side frame member from two adjacent panels.

11. The fencing structure of claim 10, wherein the upper and lower frame members have a planar central portion and angled, integral longitudinal edges angled upwardly or downwardly with respect to the central portion.

12. The fencing structure of claim 11, wherein the planar sheet material layers are made from an acrylic polymer.

13. The fencing structure of claim 10 further including L-shaped retaining clips secured to the frame structure for retaining the planar sheet material layers in close proximity to the frame structure.

14. The fencing structure of claim 10 further including a spacing member integrally attached to, and defining a spacing between the upper and lower binge structures.

15. The fencing structure of claim 14, wherein said spacing member comprises a tubular polymeric structure.

16. The fencing structure of claim 10, further including gate means for attaching and disconnecting two adjacent end panels for access to within the fencing structure.

17. The fencing structure of claim 10, wherein at least one of the planar sheet material layers is removable.

18. The fencing structure of claim 10, wherein one of the panels does not include a planar sheet material layer, and further including an animal cage, having a width about the same size as a span between adjacent vertical side frame structures of said panel, disposed adjacent to said vertical side frame members, for release of the animal within the fencing structures.

19. The fencing structure of claim 10, wherein the planar sheet material forming the hinge structure comprises a planar sheet of polymeric material.

20. A collapsible fencing structure for containing animals comprising:
   a plurality of rectangular panels hingedly interconnected; each panel including a hollow, rectangular, polymeric tubular frame structure including upper and lower tubular frame members interconnected to vertical side frame members; each panel including a planar sheet material layer held in close proximity to said frame structure, wherein one of the panels does not include a planar sheet material layer, and further including an animal cage, having a width about the same size as a span between adjacent vertical side frame structures of said panel, disposed adjacent to said vertical side frame members, for release of the animal within the fencing structure; and
   pair of spaced hinge-structures hingedly interconnecting an upper portion and a lower portion of side frame members of adjacent panels to permit adjacent panels to be collapsed one upon another for storage and transportation of the fencing structure when not in use, and to enable the fencing structure to be erected to form an animal enclosure.

21. A collapsible fencing structure for containing animals comprising:
   a plurality of rectangular panels hingedly interconnected; each panel including a pair of vertical, spaced, polymeric tubular side frame members interconnected to upper and lower frame members; each panel including a planar sheet material layer held in close proximity to said upper, lower and pair of side frame members, wherein one of the panels does not include a planar sheet material layer, and further including an animal cage, having a width about the same size as a span between adjacent vertical side frame structures of said panel, disposed adjacent to said vertical side frame members, for release of the animal within the fencing structures, and
   a pair of spaced hinge structures hingedly interconnecting an upper portion and a lower portion of said side frame members of adjacent panels to permit adjacent panels to be collapsed one upon another for storage and transportation of the fencing structure when not in use, and to enable the fencing structure to be erected to form an animal enclosure.

* * * * *

UNITED STATES PATENT AND TRADEMARK OFFICE
CERTIFICATE OF CORRECTION

PATENT NO. : 5,967,089
DATED : October 19, 1999
INVENTOR(S) : Gerald M. Allen

It is certified that error appears in the above-identified patent and that said Letters Patent is hereby corrected as shown below:

Column 5, line 67, delete "binge" and substitute therefor -- hinge --.

Column 6, line 35, insert -- a -- before "pair of".

Signed and Sealed this

Eighteenth Day of April, 2000

Attest:

Q. TODD DICKINSON

Attesting Officer

Director of Patents and Trademarks